United States Patent [19]

Nickel

[11] Patent Number: 4,654,041
[45] Date of Patent: Mar. 31, 1987

[54] PROCESS FOR THE REMOVAL OF SILICONES FROM FIBERS, YARNS OR TWO-DIMENSIONAL TEXTILE MATERIALS

[75] Inventor: Friedhelm Nickel, Bremen, Fed. Rep. of Germany

[73] Assignee: Hansa Textilchemie GmbH, Oyten, Fed. Rep. of Germany

[21] Appl. No.: 835,931

[22] Filed: Mar. 4, 1986

[30] Foreign Application Priority Data

Apr. 26, 1985 [DE] Fed. Rep. of Germany ....... 3515077

[51] Int. Cl.⁴ .................. D06L 1/12; B01F 17/02; C08G 77/10
[52] U.S. Cl. .................................. 8/137; 8/137.5; 8/138; 8/139
[58] Field of Search .................. 8/137, 137.5, 139

[56] References Cited

U.S. PATENT DOCUMENTS

| 3,900,407 | 8/1975 | Kaufman | 8/137 |
| 3,986,830 | 10/1976 | Kaufman | 8/137 |
| 4,145,184 | 3/1979 | Brain et al. | 8/137 |

*Primary Examiner*—A. Lionel Clingman
*Attorney, Agent, or Firm*—Toren, McGeady and Goldberg

[57] ABSTRACT

A process for removing silicones from fibers, yarns or two-dimensional textile materials by the action of aqueous preparations, which may contain surface active equilibration catalysts for organosiloxanes, and optionally detergents, wetting agents and alkali carbonates, optionally at elevated temperatures.

7 Claims, No Drawings

PROCESS FOR THE REMOVAL OF SILICONES FROM FIBERS, YARNS OR TWO-DIMENSIONAL TEXTILE MATERIALS

BACKGROUND OF THE INVENTION

1. Field of the Invention

The invention relates to a process for removing silicones from fibers, yarns or two-dimensional textile materials by treatment with aqueous preparations which may contain detergent substances, wetting agents and alkali carbonate, optionally at elevated temperatures.

2. Description of the Prior Art

Silicones are being increasingly used for the surface treatment of fibers, yarns, or two-dimensional textile materials. Moreover, silicones are used especially for hydrophobizing textiles. Fabrics treated with silicones acquire a soft and pliant feel. Yarns treated with silicones, especially with silicone oils, exhibit reduced fiber/metal friction.

The silicones used for these purposes are the liquid to pasty, chain-forming dialkylpolysiloxanes, especially dimethylpolysiloxanes that contain methylhydrogenpolysiloxanes which can be fixed on the fibers, as well as silicone resins which contain trifunctional silicone units and can be condensed on the fibers.

It is desirable that the organosilicones are difficult to remove from the fiber so that the silicone impregnation is resistant to laundering and dry cleaning. However, this property interferes with the stripping of the silicone impregnation which becomes necessary due to faulty batches. In "Chemie und Technologie der Silicone" (Chemistry and Technology of the Silicones) by Walter Noll, published by Verlag Chemie GmbH, 2nd edition, 1968, page 512, it is stated that the silicone films decomposed at elevated temperatures under acidic conditions. Such treatment can be combined with the use of solvent-containing detergents. However, such an aggressive procedure frequently leads to damage to the fibers.

Furthermore, it is well known that silicone impregnants can be removed from textile materials by treating the textile materials with aqueous preparations which contain detergent substances, oxalic acid and soda. While this procedure is somewhat more gentle, it does not permit complete removal of the silicones from the textile surfaces and fails especially when the silicones are crosslinked to products of high molecular weight.

SUMMARY OF THE INVENTION

I have discovered a process which will permit the removal of silicone impregnations from the surface of fibers, yarns or two-dimensional textile materials under conditions that are as gentle as possible. The textile materials thus treated exhibit a wetting behavior similar to that before the impregnation. As a result, they can be subjected to further treatments, for example, to a new or tinting dyeing process, if desired.

This is accomplished in accordance with the present invention by treating the fabric with preparations which contain surface active equilibration catalysts of organosiloxanes in amounts of 0.2 to 5 weight percent, based on the aqueous preparation. As used herein, equilibration catalysts are understood to be compounds which are capable of breaking and reforming siloxane bonds. The equilibration catalysts used in the process of the present invention should have the capability of reducing the surface tension of water to a value of 50 mN/m or less in, at most, a 1% solution.

DESCRIPTION OF THE PREFERRED EMBODIMENTS

The surface active equilibration catalysts may be selected from a variety of different classes of compounds. Particularly preferred in this connection are:

(a) organic sulfonic acids, such as, for example, the alkanesulfonic acids with octanesulfonic acid being particularly preferred. Furthermore, alkylarylsulfonic acids are preferred in which the alkyl radical should have 8 to 18, and, especially, 8 to 12 carbon atoms. As alkylarylsulfonic acids, especially octylbenzenesulfonic, nonylbenzenesulfonic acid and dodecylbenzenesulfonic acid have particularly good properties for use in the inventive process. Furthermore, the semisulfonates of long-chain alcohols, for example, dodecylsulfonate esters, are well suited.

(b) partial esters of phosphoric acid and aliphatic alcohols with 3 to 15 carbon atoms or optionally alkyl-substituted phenols. Examples of such partial phosphate esters are propyl, isopropyl, butyl, isobutyl, pentyl, isopentyl, octyl, isooctyl, decyl, isodecyl, lauryl, and isotridecyl monoesters and diesters of phosphoric acid or the partial phosphate esters of octylphenol, nonylphenol or dodecylphenol. The partial phosphate esters may, however, contain small amounts of phosphate triesters. However, the triester content should not exceed 3 weight percent.

(c) surface active organic ammonium compounds, especially of stearyldimethylbenzylammonium hydroxide, distearyldimethylammonium hydroxide, and tricaprylmethylammonium hydroxide.

The surface active equilibration catalyst should be contained in the aqueous preparations which are to be used in the present process in amounts of 0.2 to 5 weight percent, based on the aqueous preparation. Especially preferred are preparations containing 0.5 to 2 weight percent of equilibration catalyst.

The solubility of the surface active equilibration catalysts decreases as the number of carbon atoms in the alkyl, aryl or alkylaryl radicals increases. In order to be able to dissolve or, at least, finely disperse the catalysts in the aqueous preparation, it may therefore be necessary to add auxiliary solvents or dispersing agents to the aqueous preparation. Examples of such auxiliary solvents are low molecular weight water-soluble alcohols, especially isopropyl alcohol. As dispersing agents, water-soluble addition products of ethylene oxide on alkylphenols, such as, nonylphenols or tridecylalcohol, are particularly suitable. At times, the detergent substance, generally contained in the preparation, or the wetting agent contained in the preparation, is already adequate for dispersing the catalysts in the aqueous preparation. It is also possible to increase the concentration of detergent substance or wetting agent, in order to attain the desired solubilization or dispersal.

For the purpose of stripping the silicones from the textile materials, the textile materials are immersed in the aqueous preparation and agitated or stirred at temperatures of 20° C. or higher. The upper limit of the temperature is determined essentially by the maximum temperature to which the textile material may be exposed. As a rule, however, it is recommended that the treatment of the textile materials be carried out at elevated temperatures of, for example, 40° to 95° C. The length of time during which the liquor is allowed to act on the textiles is about 30 minutes to 2 hours, and especially 45 minutes to 90 minutes. The process can be carried out in washing machines commonly used in the textile industry, for example, in so-called full-width washing machines.

After the aqueous preparations have been allowed to act and have been pumped off, the textile material must be rinsed thoroughly in order to completely remove the preparation and the silicone residues dispersed in it.

The process of the present invention is illustrated by the following examples and a comparison is made with a process of the state of the art.

EXAMPLE 1

(in accordance with the invention)

During the hydrophobization of a cotton fabric with a silicone emulsion based on methylhydrogen polysiloxane, silicone spots occurred, which were noted only after the condensation reaction.

The spotted material was treated in a full-width washing machine with a preparation composed of
0.3 wt. % of didecyldimethylammonium chloride,
0.5 wt. % of di(coconut oil alkyl)dimethylammonium chloride,
0.5 wt. % of lauroylamidopropyl-N-dimethylaminoacetic acid, and
0.3 wt. % of caustic soda solution (30%).
The fabric to liquor ratio was 1:30 and the fabric was treated for 30 minutes at 95° C. Subsequently, the fabric was well rinsed and acidified. After the fabric was dried, the sports are no longer recognizable.

In testing the water uptake according to the Bundesmann rain test, the following results were obtained:
before impregnation: 72%
after impregnation: 9%
after treatment according to the present invention: 70%.
The treated fabric can subsequently be hydrophobized once again.

EXAMPLE 2

(not in accordance with the invention)

The fabric of Example 1, soiled with silicone spots, is washed for 1 hour at 50° to 60° C. according to the state of the art on a jigger with a liquor composed of:
0.5 wt. % of oxalic acid,
0.3 wt. % of ammonium sulfate, and
0.3 wt. % of a nonionic detergent, e.g., nonylphenolpolyglycol ether.
The fabric to liquor ratio is 1:30. The fabric was subsequently washed by the overflow method and then treated for one hour at boiling range with:
0.5 wt. % of soda, and
0.5 wt. % of a nonionic detergent.
After it is washed by the overflow process, the fabric was neutralized and acidified in the last rinsing bath with acetic acid. After this treatment, the dried fabric still clearly showed silicone spots.

The following water uptake values were obtained in the Bundesmann rain test:
before impregnating: 72%
after impregnating: 9%
after the treatment: 23%
Because the hydrophobicity is still noticeable, it is also impossible to redye the goods.

EXAMPLE 3

(in accordance with the invention)

In finishing a wool/polyacryl jersey with a silicone elastomer dispersion in jet equipment, distinct silicone spots appeared which, after drying, could not be removed even with chemical cleaning with perchloroethylene. The spotted fabric was treated in the jet with a preparation composed of:
0.2 wt. % of sodium dodecylbenzenesulfonate,
0.3 wt. % of sodium alkylphenol ether sulfate,
0.3 wt. % of ammonium cumene sulfonate, and
0.1 wt. % of phosphoric acid.
The fabric to liquor ratio was 1:10 and the treatment was carried out for 30 minutes at 95° C. Thereafter, the fabric was thoroughly rinsed and the silicone deposits were completely removed.

EXAMPLE 4

(in accordance with the invention)

Due to silicone deposits on parts of the machinery, silicone spots developed on cotton/polyester corduroy fabric when it was being finished with high molecular weight silicone softeners and crosslinkers. These spots could not be removed by the finisher, in spite of attempts to do so with conventional stripping processes.

This fabric was subjected to a 30 minute laundering procedure at 95° C. with a fabric to liquor ratio of 1:20 with a preparation comprising
0.5 wt. % of (coconut oil alkyl)dimethylbenzylammonium chloride,
0.1 wt. % of (coconut oil alkyl)trimethylammonium chloride,
0.1 wt. % of tricaprylmethylammonium chloride,
0.1 wt. % of distearyldimethylammonium chloride,
0.3 wt. % of sodium hydroxide (30%), and
0.3 wt. % of a nonionic detergent based on nonylphenol polyglycol ether and polyethoxylated sorbitol monolaurate.

After washing and acidifying, the silicone spots were completely removed. The corduroy could then be finished once again.

I claim:

1. In a process for removing silicones from textile materials wherein the textile material is treated with an aqueous preparation which may contain detergents, wetting agents and alkali carbonate, the improvement which comprises said preparation containing surface active equilibration catalysts for organosiloxanes selected from the group consisting of alkyl or alkylarylsulfonic acids, partial esters of phosphoric acid, aliphatic alcohols with 3 to 15 carbon atoms or alkyl-substituted phenols, and surface active quaternary ammonium compounds, said catalysts being present in amounts of 0.2 to 5 weight percent, based on the aqueous preparation.

2. The process of claim 1 wherein the catalysts have the property of reducing the surface tension of water to a value of 50 mN/m or less in concentrations of no more than 1 percent.

3. The process of claim 1 wherein the amount of catalyst is from 0.5 to 2 weight percent.

4. The process of claim 1 wherein the temperature is greater than 20° C.

5. The process of claim 1 wherein the temperature is from 40° to 95° C.

6. The process of claim 1 wherein the period of treatment is from 0.5 to 2 hours.

7. The process of claim 1 wherein the period of treatment is from 45 to 90 minutes.

* * * * *